US012651801B2

(12) United States Patent
Lee et al.

(10) Patent No.: US 12,651,801 B2
(45) Date of Patent: Jun. 9, 2026

(54) BATTERY MODULE AND BATTERY PACK INCLUDING THE SAME

(71) Applicant: LG ENERGY SOLUTION, LTD., Seoul (KR)

(72) Inventors: Junghoon Lee, Daejeon (KR); Kwangmo Kim, Daejeon (KR); Junyeob Seong, Daejeon (KR); Hyemi Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 641 days.

(21) Appl. No.: 18/017,064

(22) PCT Filed: Nov. 10, 2021

(86) PCT No.: PCT/KR2021/016298
§ 371 (c)(1),
(2) Date: Jan. 19, 2023

(87) PCT Pub. No.: WO2022/124598
PCT Pub. Date: Jun. 16, 2022

(65) Prior Publication Data
US 2023/0299416 A1     Sep. 21, 2023

(30) Foreign Application Priority Data

Dec. 7, 2020     (KR) ........................ 10-2020-0169334
Nov. 4, 2021     (KR) ........................ 10-2021-0150561

(51) Int. Cl.
*H01M 50/383*     (2021.01)
*H01M 50/211*     (2021.01)
*H01M 50/289*     (2021.01)

(52) U.S. Cl.
CPC ....... *H01M 50/383* (2021.01); *H01M 50/211* (2021.01); *H01M 50/289* (2021.01)

(58) Field of Classification Search
CPC ............ H01M 50/204; H01M 50/383; H01M 50/289; H01M 50/211; H01M 50/24; H01M 50/48; H01M 50/474; H01M 50/209; H01M 50/483; H01M 50/224; H01M 50/222; H01M 50/291; H01M 50/477
See application file for complete search history.

(56) References Cited

U.S. PATENT DOCUMENTS

2011/0262792 A1     10/2011     Lee et al.
2014/0193685 A1     7/2014     Lim
2018/0034121 A1*     2/2018     Kwon ................. H01M 10/627
(Continued)

FOREIGN PATENT DOCUMENTS

CN     110832664 A     2/2020
CN     210838029 A     6/2020
(Continued)

*Primary Examiner* — Karie O'Neill Apicella
(74) *Attorney, Agent, or Firm* — Bryan Cave Leighton Paisner LLP

(57) ABSTRACT

A battery module including a battery cell stack formed by stacking a plurality of battery cells, and a barrier layer interposed between adjacent battery cells of the plurality of battery cells. The barrier layer includes a body part parallel to the battery cell, and an extension part that is bent at one end of the body part and covers the upper end part of the battery cell.

11 Claims, 5 Drawing Sheets

(56)        References Cited

U.S. PATENT DOCUMENTS

| | | | |
|---|---|---|---|
| 2020/0035967 A1 | 1/2020 | Yoon et al. | |
| 2020/0067040 A1 | 2/2020 | Kim et al. | |
| 2020/0099114 A1* | 3/2020 | Ryu | H01M 10/647 |
| 2020/0287180 A1 | 9/2020 | Chen et al. | |
| 2020/0335737 A1 | 10/2020 | Hilligoss et al. | |
| 2023/0198051 A1 | 6/2023 | Stude et al. | |
| 2023/0299416 A1 | 9/2023 | Lee et al. | |

FOREIGN PATENT DOCUMENTS

| | | | |
|---|---|---|---|
| CN | 111512464 | A | 8/2020 |
| CN | 111668404 | A | 9/2020 |
| CN | 211404688 | U | 9/2020 |
| CN | 211789178 | | 10/2020 |
| CN | 112005429 | A | 11/2020 |
| CN | 217544739 | U | 10/2022 |
| JP | 2009-140786 | A | 6/2009 |
| JP | 2012033464 | | 2/2012 |
| JP | 5028346 | B2 | 9/2012 |
| JP | 2018-206605 | A | 12/2018 |
| JP | 2020524370 | | 8/2020 |
| KR | 10-0944980 | B1 | 3/2010 |
| KR | 10-2013-0064704 | A | 6/2013 |
| KR | 10-2019-0094921 | A | 8/2019 |
| KR | 10-2020-0021609 | A | 3/2020 |
| KR | 10-2020-0128411 | A | 11/2020 |
| WO | 2017110037 | | 6/2017 |
| WO | 2019121641 | | 6/2019 |

* cited by examiner

【FIG. 1】
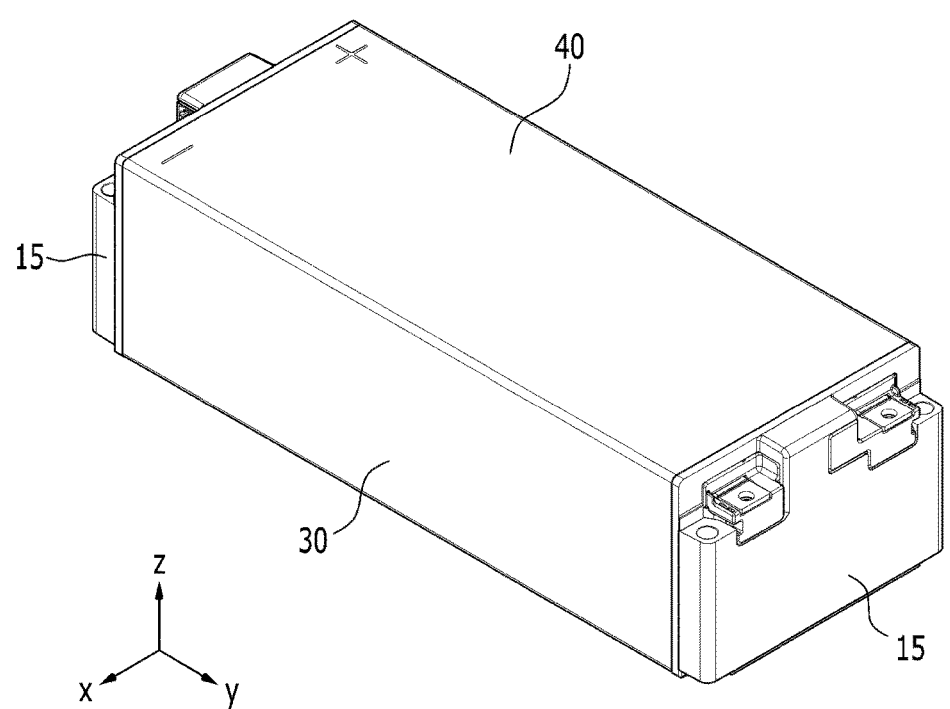
【FIG. 2】
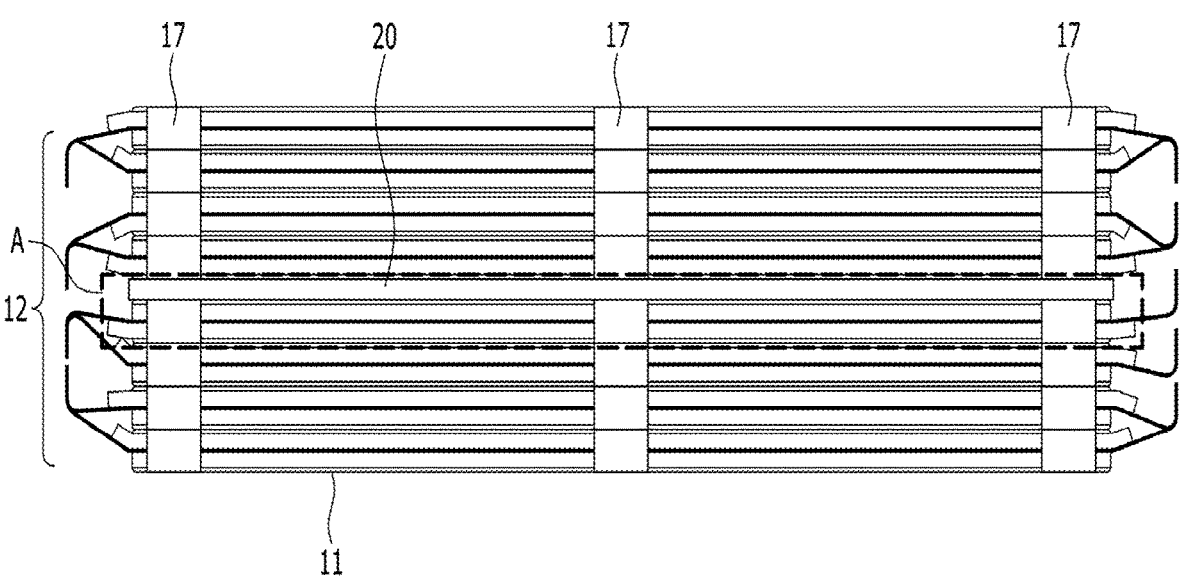

【FIG. 3A】
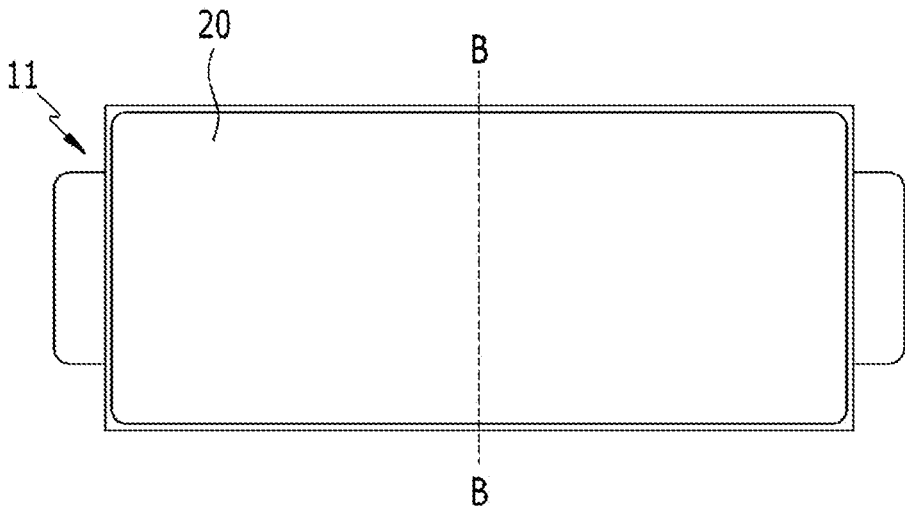
【FIG. 3B】
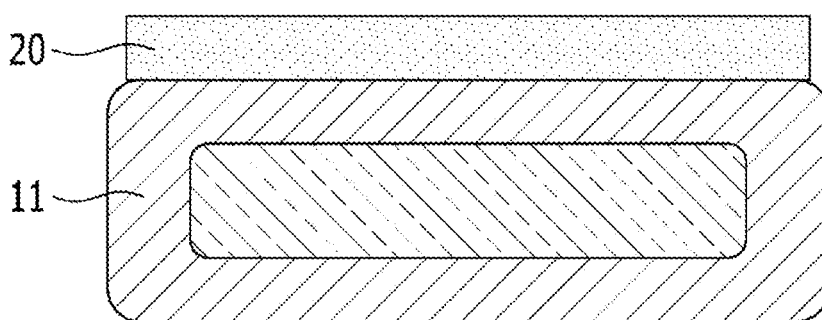

【FIG. 4】
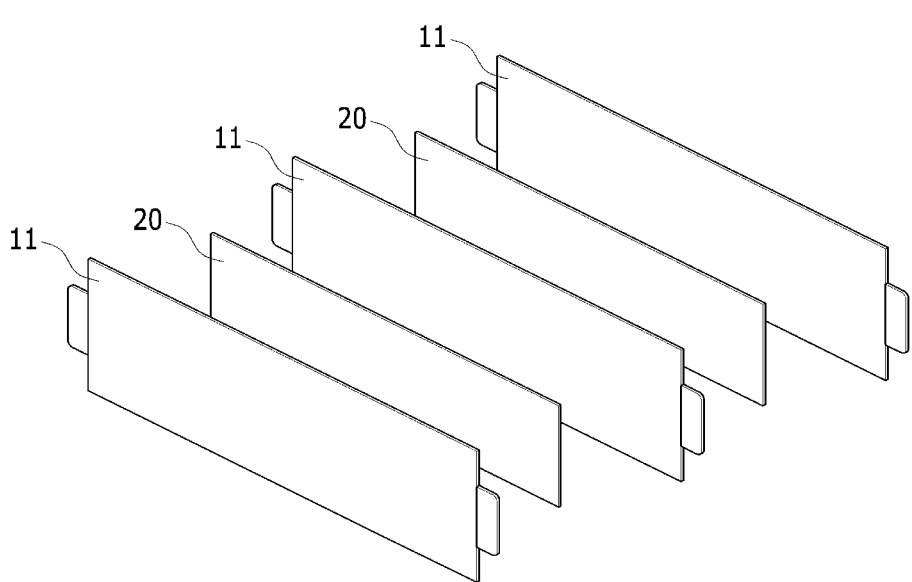
【FIG. 5】
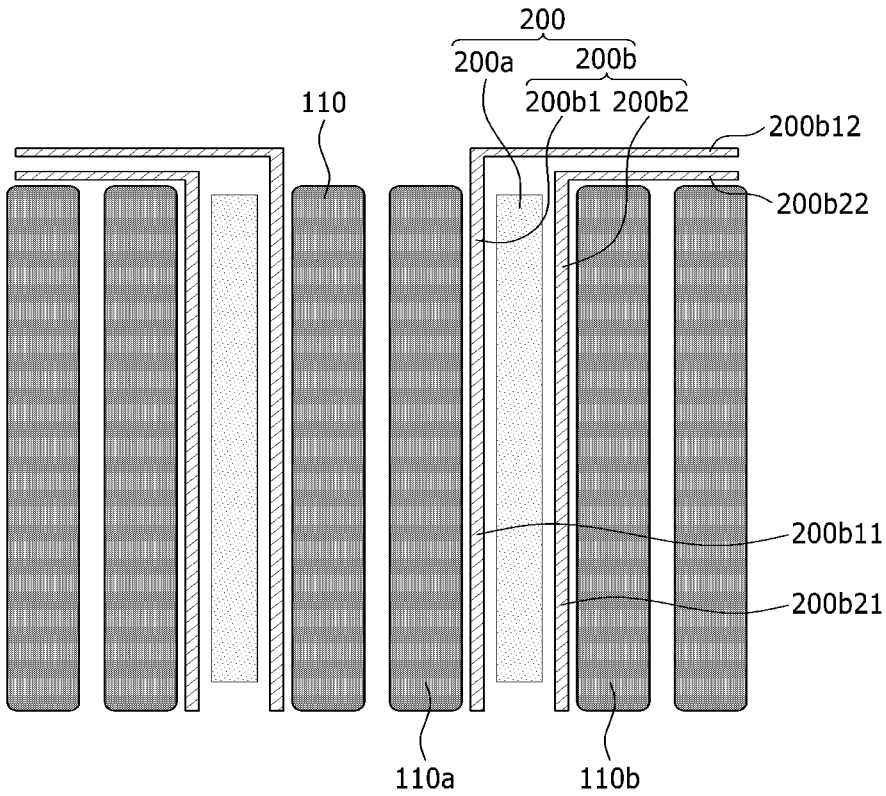

【FIG. 6】
110
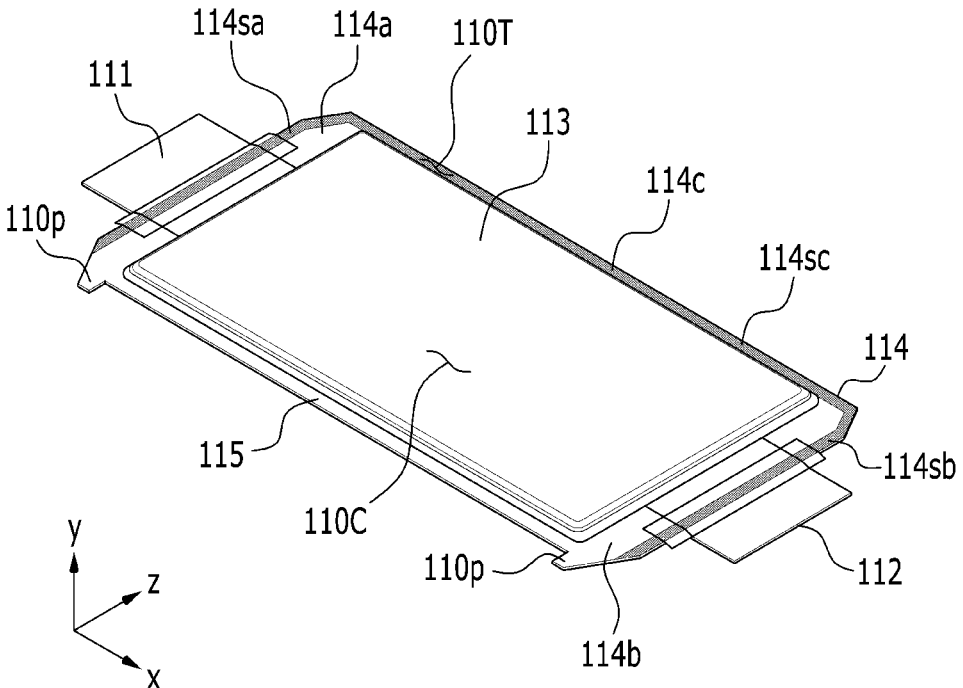

【FIG. 7】
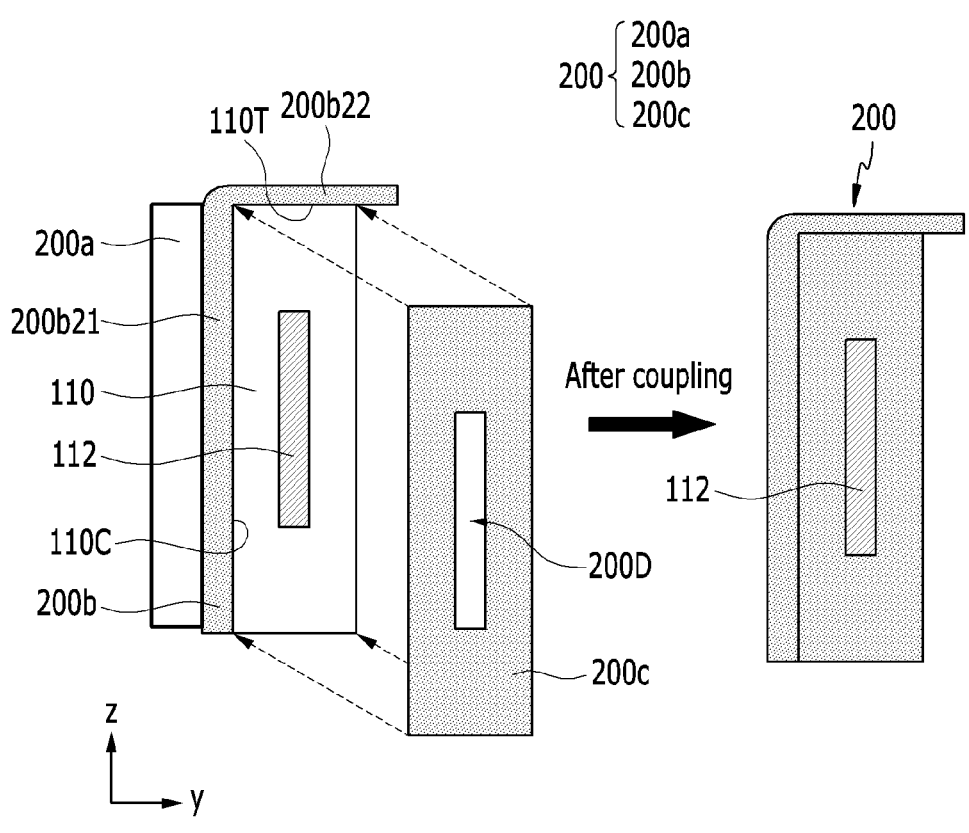

BATTERY MODULE AND BATTERY PACK INCLUDING THE SAME

CROSS-REFERENCE TO RELATED APPLICATIONS

This application is a US national phase of international Application No. PCT/KR2021/016298 filed on Nov. 10, 2021, and claims the benefit of Korean Patent Application No. 10-2020-0169334 filed on Dec. 7, 2020 and Korean Patent Application No. 10-2021-0150561 filed on Nov. 4, 2021, the contents of which are incorporated herein by reference in their entirety.

TECHNICAL FIELD

The present disclosure relates to a battery module and a battery pack including the same, and more particularly, to a battery module that effectively delays the speed of heat propagation between battery cells, and a battery pack including the same.

BACKGROUND

As technology development and demands for mobile devices increase, the demand for batteries as energy sources is also rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

A medium- or large-sized battery module is preferably manufactured to have as small a size and weight as possible. For this reason, a prismatic battery, a pouch-type battery or the like, which can be stacked with high integration and has a small weight to capacity ratio, is usually used as a battery cell of the medium- or large-sized battery module. Meanwhile, the battery module may include a housing in which a front surface and rear surface are opened to house the battery cell stack in an internal space to protect the battery cell stack from external impact, heat or vibration.

FIG. 1 is a perspective view of a conventional battery module. FIG. 2 is a top view of a battery cell stack included in a conventional battery module. FIG. 3(a) is a plane view of the region A of FIG. 2 when viewed from above, and FIG. 3(b) is a cross-sectional view along line B-B of FIG. 3(a).

As illustrated in FIGS. 1 and 2, the conventional battery module includes a battery cell stack 12 in which a plurality of battery cells 11 are stacked in one direction, a housing for the battery cell stack 12 including a lower frame 30 for covering the lower and both side surfaces of the battery cell stack 12 and an upper plate 40 for covering the upper surface of the battery cell stack 12, and a pair of end plates 15 for covering the front and rear surfaces of the battery cell stack 12.

In addition, the battery cell stack 12 includes a fixing member 17 for fixing the plurality of battery cells 11 to each other, and the fixing member 17 is located at a central part and/or an end part of the battery cell stack 12. Further, a compression pad 20 is located between a pair of battery cells adjacent to each other in the battery cell stack 12.

As illustrated in FIGS. 2 and 3, the compression pad 20 located in the conventional battery cell stack makes contact with the upper surface or the lower surface of the battery cells 11. The compression pad 20 can absorb the impact propagated to adjacent battery cells 11. Further, when the battery cell 11 ignites, the heat propagation speed can be delayed due to the thickness possessed by the compression pad 20. However, when the battery cells 110 ignite, secondary cell ignition may occur due to heat conduction between adjacent battery cells 11 and external heat conduction caused by flames generated in the battery cells 11.

Consequently, it is difficult to sufficiently perform the role of delaying the heat propagation speed by using only the conventional compression pad 20. Therefore, there is a need to develop a battery module that effectively delays the speed of heat propagation between battery cells unlike the conventional one.

SUMMARY

It is an objective of the present disclosure to provide a battery module that effectively delays the speed of heat propagation between battery cells, and a battery pack including the same.

However, the technical problem to be solved by embodiments of the present disclosure is not limited to the above-described problems, and can be variously expanded within the scope of the technical idea included in the present disclosure.

According to one exemplary embodiment of the present disclosure, there is provided a battery module comprising: a battery cell stack formed by stacking a plurality of battery cells, and a barrier layer interposed between battery cells adjacent to each other among the plurality of battery cells, wherein the barrier layer includes a body part parallel to the battery cell, and an extension part that is bent at one end of the body part and covers the upper end part of the battery cell.

The extension part may be formed of a flexible material, and cover upper end parts of at least two battery cells.

The barrier layer may include a first barrier layer disposed parallel to the battery cell, and a second barrier layer disposed between the first barrier layer and the battery cell, and the second barrier layer may include a body part disposed parallel to the first barrier layer, and an extension part that is bent at one end of the body part and covers the upper end part of the battery cell.

The first barrier layer is located between a first battery cell and a second battery cell adjacent to each other, the second barrier layer includes a 2-1 barrier layer located between the first barrier layer and the first battery cell, and a 2-2 barrier layer located between the first barrier layer and the second battery cell, and a first extension part of the 2-1 barrier layer and a second extension part of the 2-2 barrier layer may be bent in the same direction.

The first extension part and the second extension part may overlap each other.

The body part may include an additional extension part that covers an end part of the battery cell in which the electrode lead is located.

An opening for passing the electrode lead may be formed in the additional extension part of the body part.

The barrier layer may be formed of a flame retardant member.

The first barrier layer may be formed of a silicon material, a mica material, or a mixed material thereof, and the second barrier layer may be formed of a mica material.

The battery module comprises at least two or more barrier layers, and at least two or more battery cells are located between adjacent barrier layers of the two or more barrier layers.

The extension parts of the barrier layers adjacent to each other may be bent in mutually different directions.

According to another exemplary embodiment of the present disclosure, there is provided a battery pack comprising the above-mentioned battery module.

According to exemplary embodiments of the present disclosure, the barrier layer formed between a pair of battery cells adjacent to each other in the battery cell stack functions as a flame retardant member, thereby delaying the speed of heat propagation between adjacent battery cells when a battery cell ignites.

Further, the barrier layer is applied not only to the body part of the battery cell but also to the top part and lead part of the battery cell extending therefrom, thereby capable of delaying the speed of heat propagation into a battery cell in which no flame occurs by cell external flames.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a conventional battery module;

FIG. 2 is a top view of a battery cell stack contained in a conventional battery module.

FIG. 3A is a plane view of region A of FIG. 2 when viewed from above, and FIG. 3B is a cross-sectional view along line B-B of FIG. 3A;

FIG. 4 is a schematic of a method of forming a battery cell stack according to a comparative example;

FIG. 5 is a schematic of a method of forming a battery cell stack included in a battery module according to an exemplary embodiment of the present disclosure;

FIG. 6 is a perspective view of one battery cell included in the battery cell stack of FIG. 5; and FIG. 7 is an illustration of a barrier layer that extends in a protruding direction of an electrode lead from a battery cell included in a battery module according to another exemplary embodiment of the present disclosure.

DETAILED DESCRIPTION

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 4 is a schematic of a method of forming a battery cell stack according to a comparative example.

As illustrated in FIG. 4, in the step of stacking the battery cells 11, the battery cells 11 can be stacked by interposing a compression pad 20 between two adjacent battery cells 11. After stacking the compression pad 20, stacking of the battery cells 11 can be continuously performed. The compression pad 20 may have a constant thickness. The compression pad 20 can play a role in preventing cell swirling and can delay heat propagation to some extent when the cell ignites. The battery cells 11 and the compression pad 20 can be stacked to form a battery cell stack, and subsequently, subjected to a lead welding process and a module frame process to form a battery module.

FIG. 5 is a schematic of a method of forming a battery cell stack included in a battery module according to an exemplary embodiment of the present disclosure. FIG. 6 is a perspective view of one battery cell included in the battery cell stack of FIG. 5.

As illustrated in FIG. 5, the battery cell stack included in the battery module according to the present embodiment is formed by stacking a plurality of battery cells 110, and includes a barrier layer 200 interposed between battery cells 110 adjacent to each other among the plurality of battery cells 110. The barrier layer 200 according to the present embodiment includes body parts 200*b*11 and 200*b*21 disposed parallel to the battery cells 110, and extension parts 200*b*12 and 200*b*22 that are bent at one end of the body parts 200*b*11 and 200*b*21, respectively, and covers the upper end part of the battery cell 110. The barrier layer 200 according to the present embodiment includes a first barrier layer 200*a* disposed parallel to the battery cell 110, and a second barrier layer 200*b* disposed between the first barrier layer 200*a* and the battery cell 110.

The second barrier layer 200*b* includes body parts 200*b*11 and 200*b*21 disposed parallel to the first barrier layer 200*a*, and extension parts 200*b*12 and 200*b*22 that are bent at one end of the body parts 200*b*11 and 200*b*21, respectively, and cover the upper end part of the battery cell 110. The extension parts 200*b*12 and 200*b*22 may be formed of a flexible material, and cover upper end parts of at least two battery cells 110.

More specifically, the first barrier layer 200*a* is located between a first battery cell 110*a* and a second battery cell 110*b* adjacent to each other, and the second barrier layer 200*b* may include a 2-1 barrier layer 200*b*1 located between the first barrier layer 200*a* and the first battery cell 110*a*, and a 2-2 barrier layer 200*b*2 located between the first barrier layer 200*a* and the second battery cell 110*b*. A first extension part 200*b*12 of the 2-1 barrier layer 200*b*1 and a second extension part 200*b*22 of the 2-2 barrier layer 200*b*2 may be bent in the same direction. The first extension part 200*b*12 and the second extension part 200*b*22 may overlap each other, and the overlapping part thereof may be an upper end part of at least one battery cell 110.

According to the present embodiment, the first extension part 200*b*12 and the second extension part 200*b*22 cover the upper end part of the battery cell 110 while overlapping each other, thereby being capable of cutting off external propagation caused by inter-cell flames.

The barrier layer 200 according to this embodiment is made of a flame retardant member. At this time, the first barrier layer 200*a* may be formed of a silicon material, a mica material, or a mixed material thereof, and the second barrier layer 200*b* may be formed of a mica material. The first barrier layer 200*a* may be formed as a mica sheet, and the second barrier layer 200*b* may be formed of a thin mica material having a thickness of about 1 mm or less and having a bendable form.

In the battery module according to the present embodiment, at least two or more first barrier layer 200 can be included, and at least two or more battery cells 110 may be located between two barrier layers 200 adjacent to each other among the barrier layers 200.

Further, according to the present embodiment, the extension parts of the barrier layers 200 adjacent to each other may be bent in mutually different directions. For example, as shown in FIG. 5, the extension parts included in the barrier layer 200 located on the right side with respect to the two central battery cells 110 are bent in the right direction, and the extension parts included in the barrier layer 200 located on the left side with respect to the two central battery cells 110 may be bent in the left direction.

The battery cell 110 according to the embodiment of the present disclosure is preferably a pouch-type battery cell. For example, s illustrated in FIG. 6, the battery cell 110 according to the present embodiment has two electrode leads 111 and 112 facing each other and protruding from one end part 114*a* and the other end part 114*b* of the battery body 113, respectively. The battery cell 110 can be produced by adhering both end parts 114*a* and 114*b* of a battery case 114 and one side part 114*c* connecting them in a state in which an electrode assembly (not shown) is housed in the battery case 114. In other words, the battery cell 110 according to the present embodiment has a total of three sealing parts 114*sa*, 114*sb* and 114*sc*, and the sealing parts 114*sa*, 114*sb* and 114*sc* are sealed by a method such as heat fusion, and the other side part may be formed of a connection part 115. Both end parts 114*a* and 114*b* of the battery case 114 can be located in the longitudinal direction of the battery cell 110, and one side part 114*c* connecting both end parts 114*a* and 114*b* of the battery case 114 and the connection part 115 can correspond to the width direction of the battery cell 110.

The connection part 115 extends along one edge of the battery cell 110, and a protrusion part 110*p* of the battery cell 110 can be formed at the end part of the connection part 115 and can protrude in a direction perpendicular to the direction in which the connection part 115 extends. The protrusion part 110*p* may be located between one of the sealing parts 114*sa* and 114*sb* of both end parts 114*a* and 114*b* of the battery case 114 and the connection part 115.

The battery case 114 generally has a laminate structure of a resin layer/a metal thin film layer/a resin layer. For example, when the surface of the battery case is formed of an O (oriented)-nylon layer, it tends to slide easily due to external impact when stacking a plurality of battery cells to form a medium- or large-sized battery module. Therefore, a battery cell stack can be formed by attaching an adhesive member such as a cohesive-type adhesive such as a double-sided tape or a chemical adhesive bonded by chemical reaction during adhesion to the surface of the battery case to prevent this problem and maintain stability of the battery cell stack. In the present embodiment, the battery cell stack 120 can be stacked in the y-axis direction.

FIG. 7 is an illustration of a barrier layer that extends in a protruding direction of an electrode lead from a battery cell included in a battery module according to another embodiment of the present disclosure.

The reference numerals of the body part 200*b*21 and the second extension part 200*b*22 of the 2-2 barrier layer 200*b*2 described above are used together in FIG. 7 and the following description to explain the body part and the extension part of the second barrier layer 200*b*. However, this is for convenience of explanation only, and the contents described below can also be applied to the body part 200*b*11 and the first extension part 200*b*12 of the 2-1 barrier layer 200*b*1. Further, in the above-mentioned contents, the reference number '200*b*22' has been described as the second extension part 200*b*22, but for convenience of explanation, this is shown as an 'extension part' in the description of FIG. 7.

As illustrated in FIG. 7, the barrier layer 200 according to the present embodiment includes a second barrier layer 200*b* for covering the body part 110C of the battery cell 110 of FIG. 6, and the second barrier layer 200*b* may include a body part 200*b*21 disposed parallel to the first barrier layer 200*a*, and an extension part 200*b*22 that is bent at one end of the body part 200*b*21 and covers the upper end part 110T of the battery cell 110, as described above.

The body part 110C of the battery cell 110 refers to one surface of the battery cell 110 facing the y-axis direction, which is the stacking direction of the battery cells 110, and the upper end part 110T of the battery cell 110 may be a portion corresponding to one side part 114*c* that connects both end parts 114*a* and 114*b* of a battery case 114 in FIG. 6. In other words, the upper end part 110T of the battery cell 110 may refer to the upper end part based on the width direction of the battery cell 110.

The thickness of the body part 200*b*21 of the second barrier layer 200*b* may be larger than the thickness of the extension part 200*b*22 of the second barrier layer 200*b*. The second barrier part 200*b* can be formed to be relatively thick, thereby increasing the flame retarding performance of interrupting heat propagation between adjacent battery cells 110. The occurrence of a gap between the module frame for housing the battery cell stack and the upper end part of the battery cell 110 can be minimized because the extension part 200*b*22 of the second barrier part 200*b* can be relatively thin. In addition, the extension part 200*b*22 of the second barrier part 200*b* is formed of a flexible material, so that the double-side folding structure of the upper end of the battery cell 110 can be closely covered.

As illustrated in FIG. 7, the barrier layer 200 according to the present embodiment may further include a third barrier part 200*c* for covering an end part of the battery cell 110 around the electrode leads 111 and 112 protruding from the battery cell 110. An opening 200D for passing the electrode leads 111 and 112 may be formed in the third barrier layer 200*c*. The third barrier layer 200*c* may be formed by extending the second barrier layer 200*b* or may be formed by extending the first barrier layer 200*a*, or the third barrier layer 200*c* may be referred to as an "additional extension part".

Meanwhile, one or more of the battery modules according to various embodiments of the present disclosure can be packaged in a housing to form a battery pack.

The above-mentioned battery module and the battery pack including the same can be applied to various devices. These devices can be applied to vehicle means such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements made by those skilled in the art using the basic concepts of the present disclosure defined in the following claims also belong to the scope of the present disclosure.

The invention claimed is:

1. A battery module comprising:
a battery cell stack comprising a plurality of battery cells, and
at least one barrier layer interposed between adjacent battery cells of the plurality of battery cells,
wherein the barrier layer includes a body part parallel to the plurality of battery cells and,
an extension part that covers an upper end part of at least one of the plurality of battery cells, and
wherein the extension part is a bent portion of one end of the body part,
the extension part comprises a flexible material, and
the extension part covers upper end parts of at least two of the plurality of battery cells.

2. The battery module of claim 1, wherein:
the barrier layer includes a first barrier layer disposed parallel to at least one of the plurality of battery cells, and a second barrier layer disposed between the first barrier layer and the at least one of the plurality of battery cells, and
the second barrier layer includes the body part and the extension part, and
the body part is disposed parallel to the first barrier layer.

3. The battery module of claim 2, wherein:
the first barrier layer is disposed between a first battery cell and a second battery cell of the plurality of battery cells, wherein the first and second battery cells are adjacent to each other, the second barrier layer includes a third barrier layer located between the first barrier layer and the first battery cell, and a fourth barrier layer located between the first barrier layer and the second battery cell, and
a first extension part of the third barrier layer and a second extension part of the fourth barrier layer are bent in a same direction.

4. The battery module of claim 3, wherein:
the first extension part overlaps with the second extension part.

5. The battery module of claim 1, wherein:
an end part of each of the plurality of battery cells further comprises an electrode lead, and
the body part includes an additional extension part that covers the end part of the battery cell comprising the electrode lead.

6. The battery module of claim 5, wherein:
the additional extension part comprises an opening for passing the electrode lead.

7. The battery module of claim 1, wherein:
the barrier layer comprises a flame retardant member.

8. The battery module of claim 2, wherein:
the first barrier layer comprises a silicon material, a mica material, or a mixture thereof, and
the second barrier layer comprises a mica material.

9. The battery module of claim 1, wherein:
the battery module comprises at least two or more barrier layers, and
at least two or more battery cells are located between adjacent barrier layers of the two or more barrier layers.

10. The battery module of claim 9, wherein:
each of the two or more barrier layers comprises an extension part; and
extension parts of the adjacent barrier layers are bent in mutually different directions.

11. A battery pack comprising the battery module of claim 1.

* * * * *